United States Patent
Yeh et al.

(10) Patent No.: US 10,164,547 B2
(45) Date of Patent: Dec. 25, 2018

(54) PREDICTIVE SWITCHING CONTROL FOR AN ACTIVE RECTIFIER

(71) Applicant: Industrial Technology Research Institute, Hsinchu (TW)

(72) Inventors: Po-Ting Yeh, Hsinchu (TW); Yuan-Tai Chang, Hsinchu (TW); Kai-Cheung Juang, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 15/667,846

(22) Filed: Aug. 3, 2017

(65) Prior Publication Data
US 2018/0301992 A1    Oct. 18, 2018

(30) Foreign Application Priority Data

Apr. 18, 2017    (CN) .......................... 2017 1 0254000

(51) Int. Cl.
*H02M 7/162*    (2006.01)
*H02M 7/219*    (2006.01)

(52) U.S. Cl.
CPC ........... *H02M 7/162* (2013.01); *H02M 7/219* (2013.01); *H02M 2007/2195* (2013.01)

(58) Field of Classification Search
CPC ..... H02M 7/1555–2007/2195; H02M 3/33592
See application file for complete search history.

(56) References Cited

U.S. PATENT DOCUMENTS

| 5,719,487 A | 2/1998 | Sato et al. |
| 5,719,760 A | 2/1998 | Umeda et al. |
| 6,101,104 A * | 8/2000 | Eng .......................... H02M 1/38 363/127 |

(Continued)

FOREIGN PATENT DOCUMENTS

| CN | 103780177 A | 5/2014 |
| EP | 2 400 651 A2 | 12/2011 |

(Continued)

OTHER PUBLICATIONS

A smart synchronous rectifier for 12 V automobile alternators, S. Rees, U. Ammann, IEEE Power Electronics, 2003, 1516-1521.

(Continued)

*Primary Examiner* — Gary L Laxton
*Assistant Examiner* — Peter Novak
(74) *Attorney, Agent, or Firm* — Mintz Levin Cohn Ferris Glovsky and Popeo, P.C.; Peter F. Corless; Steven M. Jensen

(57) ABSTRACT

A method and a system for controlling a rectifier can obtain a predicted switching interval. The method includes steps of: receiving frequency information and line information of a power generator, the line information including a switching point where a voltage or current crosses zero and a switching interval based on the frequency information; obtaining a predicted switching interval according to the frequency information and the line information, and obtaining a feedback signal according to two terminals of at least one component of the rectifier; and switching a switching signal of the rectifier within the predicted switching interval according to the feedback signal.

17 Claims, 8 Drawing Sheets

(56) References Cited

U.S. PATENT DOCUMENTS

| | | |
|---|---|---|
| 7,227,340 B2 | 6/2007 | Chen |
| 8,130,521 B2 | 3/2012 | Kokubun et al. |
| 8,416,548 B2 | 4/2013 | Doffin |
| 2007/0138795 A1 | 6/2007 | O'Gorman et al. |
| 2007/0176579 A1 | 8/2007 | O'Gorman et al. |
| 2011/0255320 A1 | 10/2011 | Tabata et al. |
| 2012/0099356 A1* | 4/2012 | Usami .................. H02M 7/219 363/126 |
| 2015/0146466 A1 | 5/2015 | Kim et al. |
| 2016/0111972 A1 | 4/2016 | Wolf et al. |
| 2017/0126021 A1* | 5/2017 | Desrosiers ............. H02J 5/005 |

FOREIGN PATENT DOCUMENTS

| | | |
|---|---|---|
| TW | 201404014 A | 1/2014 |
| TW | 201539964 A | 10/2015 |
| TW | 201601449 A | 1/2016 |
| TW | 201614929 A | 4/2016 |

OTHER PUBLICATIONS

Automotive Alternator Synchronous Rectification Via Self-Sensing Method for Improved Vehicle Fuel Consumption, Tony O'Gorman, Dennis Stephens, Ted Bohn, Richard Carlson, 42nd IAS Annual Meeting, 2007, 1726-1730.

High-Performance Control Design of Automotive Power Generation System with Claw-Pole Synchronous Generator and PWM Rectifier, Lu Ziguang ,Zong Kuihua, Chinese Control Conference, 2007, 233-236.

PWM regenerative rectifiers: state of the art, J.R. Rodriguez, J.W. Dixon , J.R. Espinoza , J. Ponfi , P. Lezana, IEEE Transactions on Industrial Electronics, 2005, 5-22.

Three-phase, power quality improvement ac/dc converters, Abdul HamidBhat, , Pramod Agarwal, Electric Power Systems Research, 2008, pp. 276-289.

Advanced nonlinear control of three-phase PWM rectifiers, D.-C. Lee, Power Applications ,2000, 361-366.

DC-bus voltage control of three-phase AC/DC PWM converters using feedback linearization, Dong-Choon Lee ; G-Myoung Lee ; Ki-Do Lee, IEEE Transactions on Industry Applications ,2000, 826-833.

A line-voltage-sensorless synchronous rectifier, Bong-Hwan Kwon ; Jang-Hyoun Youm ; Jee-Woo Lim, IEEE Transactions on Power Electronics ,1999, 966-972.

Multiple Voltage Electrical Power Distribution Systems for Automotive Applications, Proc. 31st Intersociety Energy Conversion Conf., IEEE Press, Piscataway, N.J., 1996, pp. 1930-1937.

European Search Report dated Mar. 14, 2018 in corresponding European Application No. 17189367.0.

* cited by examiner

PREDICTIVE SWITCHING CONTROL FOR AN ACTIVE RECTIFIER

CROSS-REFERENCE TO RELATED APPLICATIONS

The present disclosure is based on, and claims priority from Chinese Application Number 201710254000.8, filed on Apr. 18, 2017, the disclosure of which is hereby incorporated by reference herein in its entirety.

TECHNICAL FIELD

The disclosure relates to methods and systems for controlling a rectifier.

BACKGROUND

The power generation system of an automobile may include a battery, a generator and a voltage regulating device. The battery can provide power for starting the engine, the power required by the engine after ignition can be supplied by the generator, and the generator can charge the battery. As the power generated by the generator (e.g., alternator) is an alternating current (AC), and the power stored in the battery is a direct current (DC), a rectifier diode may be provided on the generator in order to convert AC into DC. One of the functions of the voltage regulating device is to block current that is not within the specification and sense operational instructions of the generator.

In order to increase the fuel efficiency, synchronous rectification method may be used, and Metal-Oxide-Semiconductor Field-Effect Transistors (MOSFET) are used instead of the diode, and are switched with the cooperation of a two-terminal voltage comparison detection. However, in the vehicle environment, there are usually a lot of noises, and the MOSFET components susceptible to false switched-off or false switched-on due to the noise. As a result, a reverse current or a large current is generated, and power is wasted. In order to solve these problems, a filter or hysteresis comparator may be added to avoid noise interference. However, a powerful filter or hysteresis comparator may cause even greater power loss.

Therefore, there is a need for a method and a system for controlling a rectifier that solve the aforementioned problems.

SUMMARY

An embodiment of the disclosure provides a method for controlling a rectifier, which may include: obtaining frequency information and switching information of a power generator; obtaining a predicted switching interval according to the frequency information and the switching information, and obtaining a feedback signal according to two terminals of at least one switching component of the rectifier; and switching a switching signal of the rectifier within the predicted switching interval according to the feedback signal.

Another embodiment of the disclosure provides a system for controlling a rectifier, which may include: a power generator; a rectifying unit including a plurality of switching components; and a control unit. In an embodiment, the control unit may include: a frequency access module configured for obtaining frequency information and switching information of the power generator; a switching interval generation module configured for obtaining a predicted switching interval according to the frequency information and the switching information; and a switching control module configured for obtaining a feedback signal and controlling a switching signal of at least one of the plurality of switching components within the predicted switching interval according to the feedback signal, wherein the feedback signal is obtained according to two terminals of the at least one of the plurality of switching components.

DETAILED DESCRIPTION

The disclosure is described by the following embodiments. Those with ordinary skills in the arts can readily understand other advantages and functions of the disclosure after reading the disclosure of this specification. The disclosure may also be practiced or applied with other different implementations. Based on different contexts and applications, the various details in this specification can be modified and changed without departing from the spirit of the disclosure.

Figure 1:
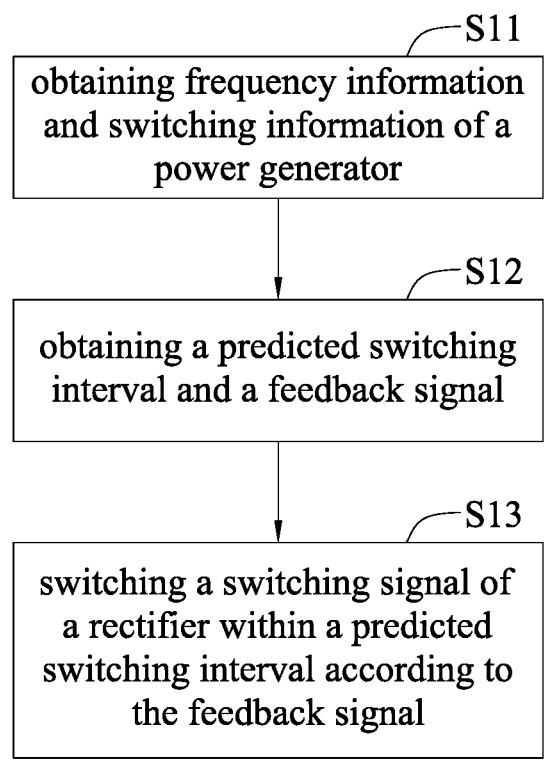
FIG. 1 is a flowchart illustrating a method for controlling a rectifier in accordance with an embodiment of the disclosure.

Referring to FIG. 1, a method for controlling a rectifier in accordance with an embodiment of the disclosure is shown. In step S11, frequency information and switching information of a power generator are obtained. The frequency information can be, for example, but not limited to be, derived (calculated) from a rotational speed of the generator (e.g., by calculating the frequency of a three-phase voltage based on the rotational speed of the generator), obtained from a three-phase alternative current generated by the generator, obtained from $V_{DS}$ of a switching component (a voltage across the drain and source terminals of the switching component), or from a current sensor. In an embodiment, switching information can be obtained based on the frequency information (e.g., switching time is obtained based on the frequency). In another embodiment, the frequency information and the switching information can be obtained independently (e.g., the switching information is obtained from either the voltage or current information, and the frequency information is obtained from any one of rotational speed, voltage, and current information) or obtained dependently. The disclosure does not limit the way the two information is obtained. In an embodiment, the switching information may include a switching interval and/or a switching point, and the switching interval can be a time interval or a particular time point. The method proceeds to step S12.

In step S12, a predicted switching interval is obtained based on the frequency information and the switching information, and a feedback signal is obtained. The feedback signal is obtained from two terminals of at least one switching component of the rectifier. In an embodiment, the feedback signal can be a feedback voltage, which is obtained by comparing the voltages between the two terminals of the switching component of the rectifier. The feedback signal can also be a feedback current, which is obtained by determining the direction of current between the two terminals of the switching component of the rectifier. In an embodiment, the predicted switching interval can be a predicted time interval or a predicted particular point in time. It should be noted that the disclosure does not limit the order in which the predicted switching interval and the feedback signal are obtained. The predicted switching interval can be obtained before the feedback signal. Alternatively, the feedback signal can be obtained before the predicted switching interval. Upon obtaining the predicted switching interval and the feedback signal, the method proceeds to the next step. The technical details of this step will be further described later. The method proceeds to step S13.

In step S13, a switching signal for the rectifier is switched according to the feedback signal in the predicted switching interval. Referring to FIGS. 1, 5, 7A and 7B, an embodiment of the disclosure is described below in more details.

Figure 5:
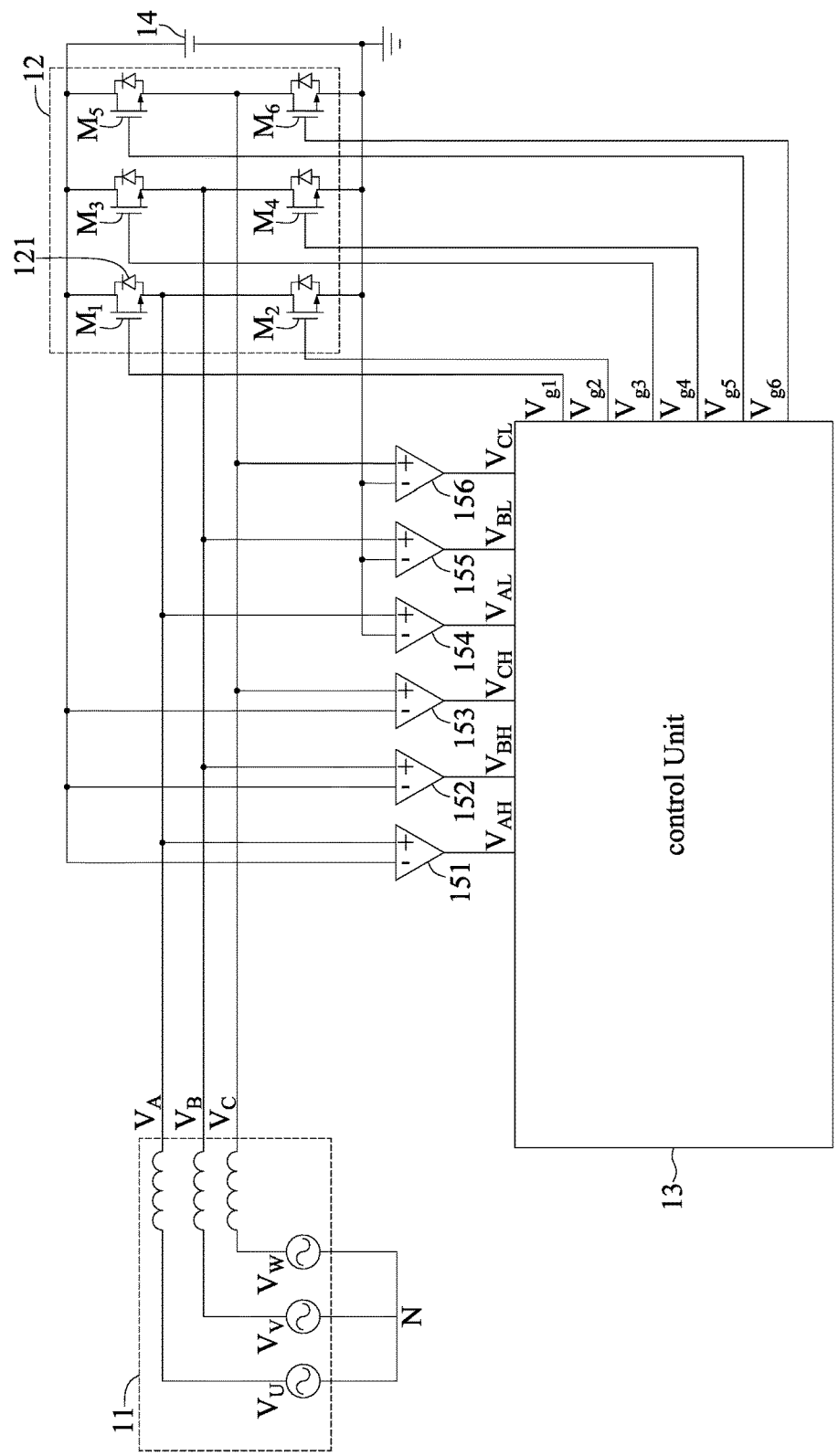
FIG. 5 is a schematic circuit diagram depicting the system for controlling a rectifier in accordance with an embodiment of the disclosure.
Figure 7A:
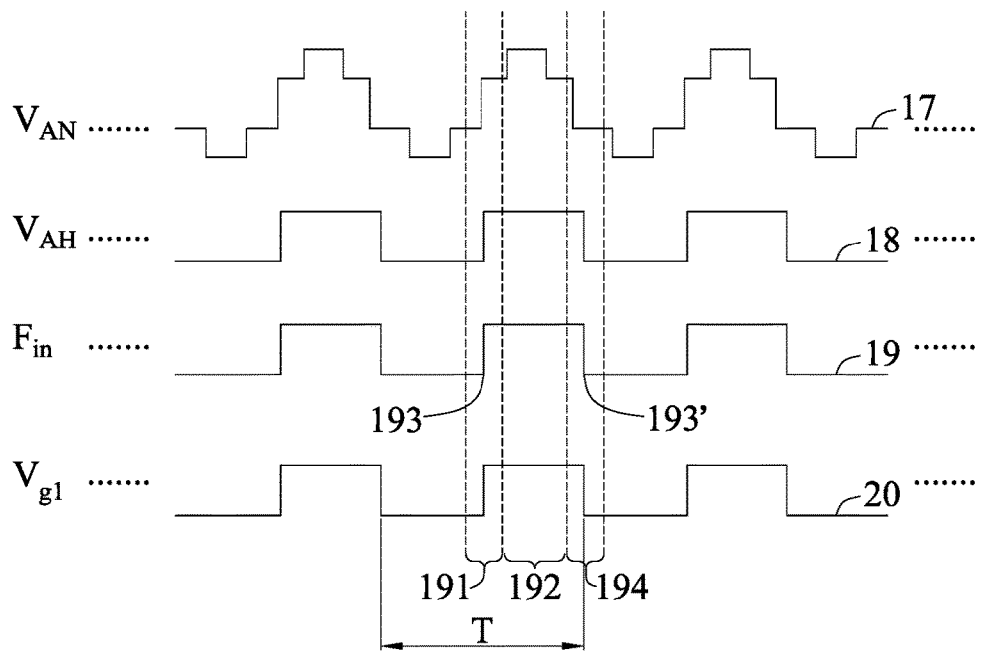
FIGS. 7A to 7D are schematic diagrams illustrating various waveforms in accordance with the disclosure.

As shown in FIG. 5, a power generator 11 in accordance to an embodiment of the disclosure is a three-phase AC power generator, and outputs a voltage waveform 17 as shown in FIG. 7A. However, the power generator 11 of the disclosure is not limited as such. The following descriptions are illustrated using a voltage waveform of one of the phases (e.g., $V_{AN}$) and a switching component $M_1$ of a rectifying unit 12 (e.g., a rectifier). Other voltage waveforms of other phases and/or other switching components have the same or similar technical contents, and thus will not be repeated.

Figure 6:
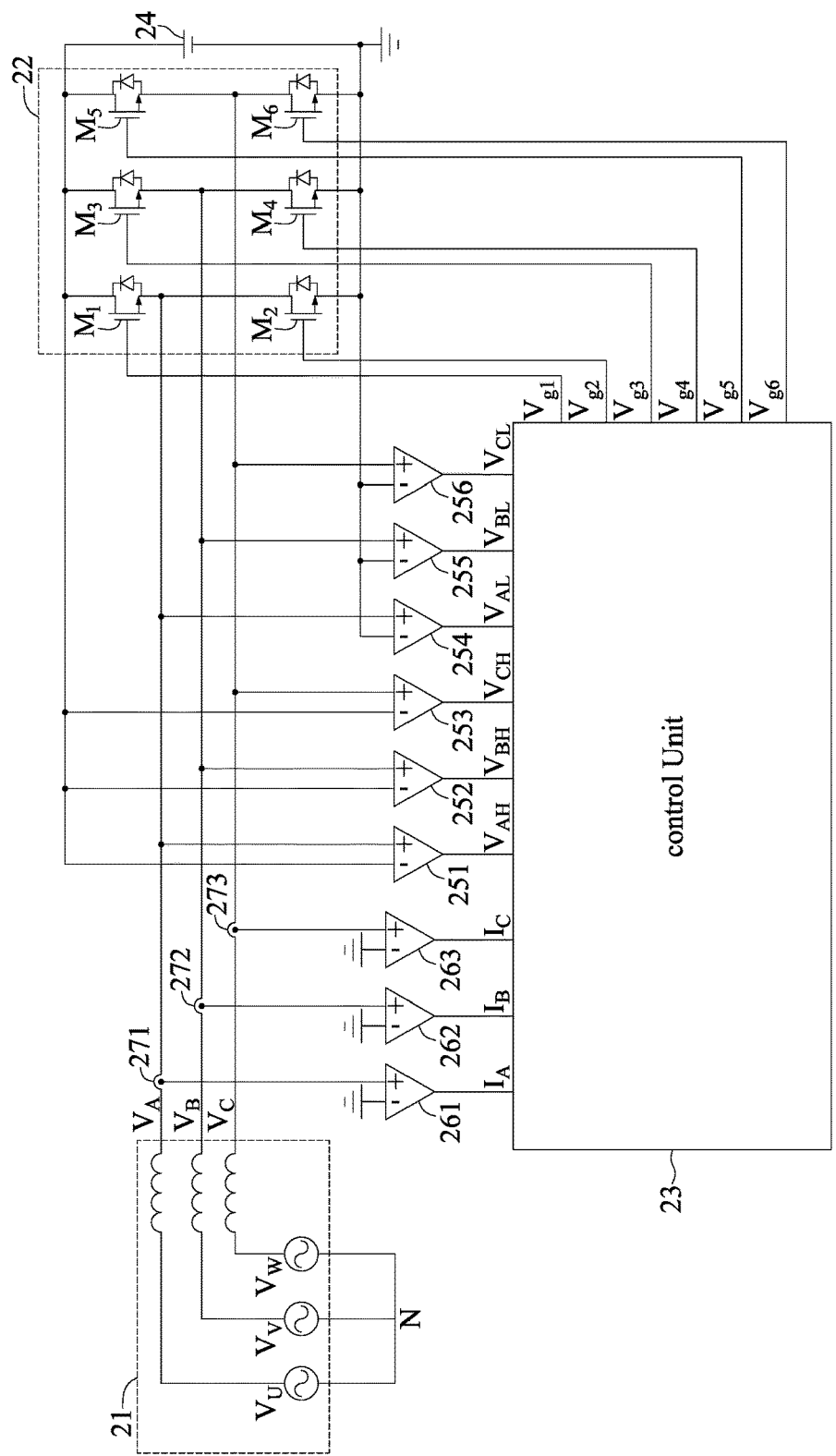
FIG. 6 is a schematic circuit diagram depicting the system for controlling a rectifier in accordance with another embodiment of the disclosure.

In an embodiment of the disclosure, the switching component $M_1$ can be, for example, a Metal-Oxide-Semiconductor Field-Effect Transistor (MOSFET). In FIGS. 7A to 7D, the switching component $M_1$ is illustrated as an N-type MOSFET (N-MOSFET), but the disclosure is not limited to this. When the power generator 11 started up, a voltage $V_A$ is provided to the switching component $M_1$ of the rectifying unit 12. The waveform of the voltage $V_{AN}$ ($V_{AN}$ is the voltage difference between $V_A$ and N in this embodiment) can be, for example, the voltage waveform 17, and is used to charge a battery 14 by passive rectification. In an embodiment, passive rectification means the battery 14 is charged using a body diode 121 in the switching component $M_1$ when the switching component M1 is switched off, for example. The voltages across the drain and the source terminals ($V_{DS}$) of the switching component $M_1$ is compared by a comparator 151 (e.g., a 1-bit comparator) to obtain a voltage $V_{AH}$. The waveform of the voltage $V_{AH}$ can be, for example, voltage waveform 18. A control unit 13, after obtaining the voltage $V_{AH}$, can then obtain frequency information (e.g., $F_{in}$ in FIGS. 7A to 7D) of the voltage $V_{AH}$ by zero crossing detection. The frequency information may exhibit, for example, a frequency information waveform 19 shown in FIGS. 7A to 7D. In an embodiment, the frequency information may include a frequency, which can be: (1) a frequency of a three-phase voltage (e.g., $V_U$, $V_V$, and $V_W$ in FIGS. 5 and 6) of the power generator 11 calculated from the rotational speed of the power generator 11; (2) obtained based on a three-phase AC current generated by the power generator 11; (3) obtained from the $V_{DS}$ of the switching component $M_1$ when the switching component $M_1$ in the rectifying unit 12 is off; and (4) obtained using a current sensor 271, 272 or 273 (as shown in FIG. 6). The above contents may correspond to step S11 in FIG. 1. In an embodiment, the zero-crossing detection means detecting when the waveform in the AC system passes through zero when switching from the positive half cycle to the negative half cycle or from the negative half cycle to the positive half cycle.

As shown in FIG. 7A, in an embodiment, the switching information is obtained based on the frequency information of the voltage $V_{AH}$. The switching information includes a switching point 193. This switching point 193 can be, for example, the time point of a zero crossing of the corresponding voltage waveform 17 detected using the zero-crossing detection method described above. In an embodiment, a car engine actuates the power generator via a belt, and the frequency information varies with the change in the rotational speed of the engine. The operation of the engine is a mechanical action, and is not likely to have discontinuous changes. Thus, in an embodiment, the frequency information will not have discontinuous changes, but increases or decreases continuously with each cycle. When the rotational speed of the engine is constant, the corresponding frequency information stays constant, too. Therefore, the next switching point 193' can be predicted from the period T of the frequency information and the switching point 193. In this embodiment, an interval between the predicted next switching point 193' and the switching point 193 is a half of the period T of the frequency information.

After the next switching point 193' is predicted, a predicted switching interval 194 is determined, with the next switching point 193' as the center, within a range of a second specific percentage range of a half of the period T of the frequency information. Similarly, a switching interval 191 can be determined, with the switching point 193 as the center, within a range of a first specific percentage range of a half of the period T of the frequency information. The first and the second specific percentage ranges of the half of the period T of the frequency information used in determining the switching interval 191 and the predicted switching interval 194 can be the same or different. For example, both can be a range of ±10%; or one can be a range of ±10% and the other can be a range of ±20%, while the disclosure is not limited as such. The first and the second specific percentages can be, for example, percentages of a half of the period T, and the disclosure is not limited as such. In an embodiment, the range (e.g., the percentage of a half of the period T) for each predicted switching interval 194 can be the same or different or partially the same (e.g., can be dynamically adjusted). For example, the ranges of the predicted switching interval 194 and the next predicted switching interval 194' in FIG. 7D can be the same or different or partially the same. In an embodiment, when a range of ±00% of a half of the period T of the frequency information is used to determine the switching interval 191 (e.g., the first specific percentage is 0%), then the switching interval 191 is the switching point 193; in an embodiment, when a range of ±00% of half of the period T of the frequency information is used to determine the predicted switching interval 194 (e.g., the second specific percentage is 0%), then the predicted switching interval 194 is the next switching point 193'; in an embodiment, the switching point 193 is used as the switching interval 191; in an embodiment, the next switching point 193' is used as the predicted switching interval 194. The interval between the switching interval 191 and the predicted switching interval 194 is a non-switching interval 192.)

As an example, assuming the power generator 11 has a system frequency of 100 Hz and an oscillator of 10 k is used, then a period T is calculated to have 100 clocks. In an embodiment, the period T is obtained using a phased-lock loop (PLL). Upon obtaining the switching point 193, the next switching point 193' is obtained by counting another 50 clocks (half of the period T) or by PLL. An embodiment of the disclosure can use this method to predict and determine at least one predicted switching interval 194.

Referring to FIGS. 5 and 7A, the feedback voltage $V_{AH}$ of the switching component $M_1$ of the rectifying unit 12 can be obtained by comparing the voltages of the drain and the source terminals of the switching component $M_1$ of the rectifying unit 12 using the comparator 151 (e.g., a 1-bit comparator). The waveform of the feedback voltage $V_{AH}$ can be, for example, a feedback voltage waveform 18. The control unit 13 receives the feedback voltage $V_{AH}$ of the switching component $M_1$ of the rectifying unit 12, and generates a switching signal $V_{g1}$ to be provided to the gate terminal of the switching component $M_1$. The waveform of the switching signal $V_{g1}$ can be, for example, a switching signal waveform 20. It should be noted that there is no particular order for determining the predicted switching interval 194 and comparing the voltages of the drain and the source terminals of the switching component $M_1$ of the rectifying unit 12. In other words, the predicted switching interval 194 may be determined before the voltages of the drain and the source terminals of the switching component $M_1$ of the rectifying unit 12 are compared; or the voltages of the drain and the source terminals of the switching component $M_1$ of the rectifying unit 12 may be compared before the predicted switching interval 194 is determined; or the voltages of the drain and the source terminals of the switching component $M_1$ of the rectifying unit 12 may be compared at the same time as the predicted switching interval 194 is determined; the disclosure is not limited as such. After the predicted switching interval 194 is obtained and the voltages of the drain and the source terminals of the switching component $M_1$ of the rectifying unit 12 are compared, the switching signal $V_{g1}$ may be switched during the predicted switching interval 194. Details of the switching signal $V_{g1}$ are described below. The above contents may correspond to the step S12 in FIG. 1.

Figure 7B:
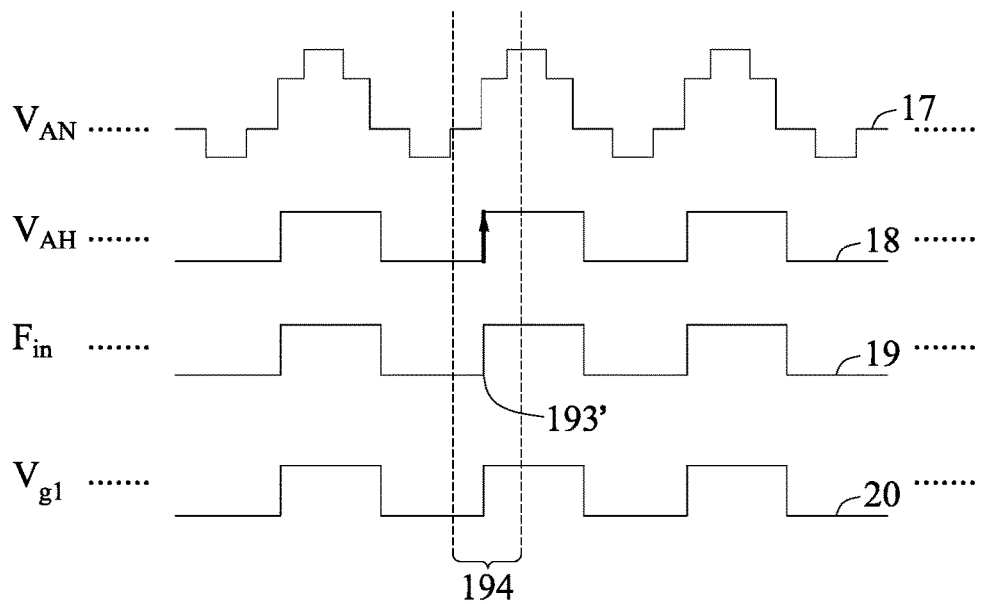

The control unit 13 may switch the switching signal $V_{g1}$ during the predicted switching interval 194 (e.g., the voltage of the switching signal $V_{g1}$ is switched so that the switching component $M_1$ is switched from on/conducting to off/non-conducting or the switching component $M_1$ is switched from off/non-conducting to on/conducting). No signal switching is performed during the non-switching interval 192. In other words, "switching" means causing the switching component $M_1$ to be in an off or on state. Moreover, as the comparator 151 compares the voltages of the drain and the source terminals of the switching component $M_1$ of the rectifying unit 12 to generate the feedback voltage $V_{AH}$, the control unit 13 may determine if the source voltage is greater than the drain voltage based on the feedback voltage $V_{AH}$ during the predicted switching interval 194 to determine whether to switch the voltage of the switching signal $V_{g1}$. If the source voltage is greater than the drain voltage, then the control unit 13 switches the voltage of the switching signal $V_{g1}$ and causes the switching component $M_1$ to be in an on/conducting state; else in an off/non-conducting state. As shown in FIG. 7B, the feedback voltage waveform 18 corresponding to the switching point 193' in the predicted switching interval 194 indicates the source voltage switches from less than the drain voltage to greater than the drain voltage, so the control unit 13 may correspondingly switch the switching signal $V_{g1}$ so as to perform signal switching to the switching component $M_1$ of the rectifying unit 12 (i.e., the switching component $M_1$ switches from off/non-conducting state to on/conducting state). For example, the switching signal $V_{g1}$ is switched from Low to High. As a result, the power generator 11 can charge the battery 14. The above contents correspond to the step S13 in FIG. 1.

Figure 2:
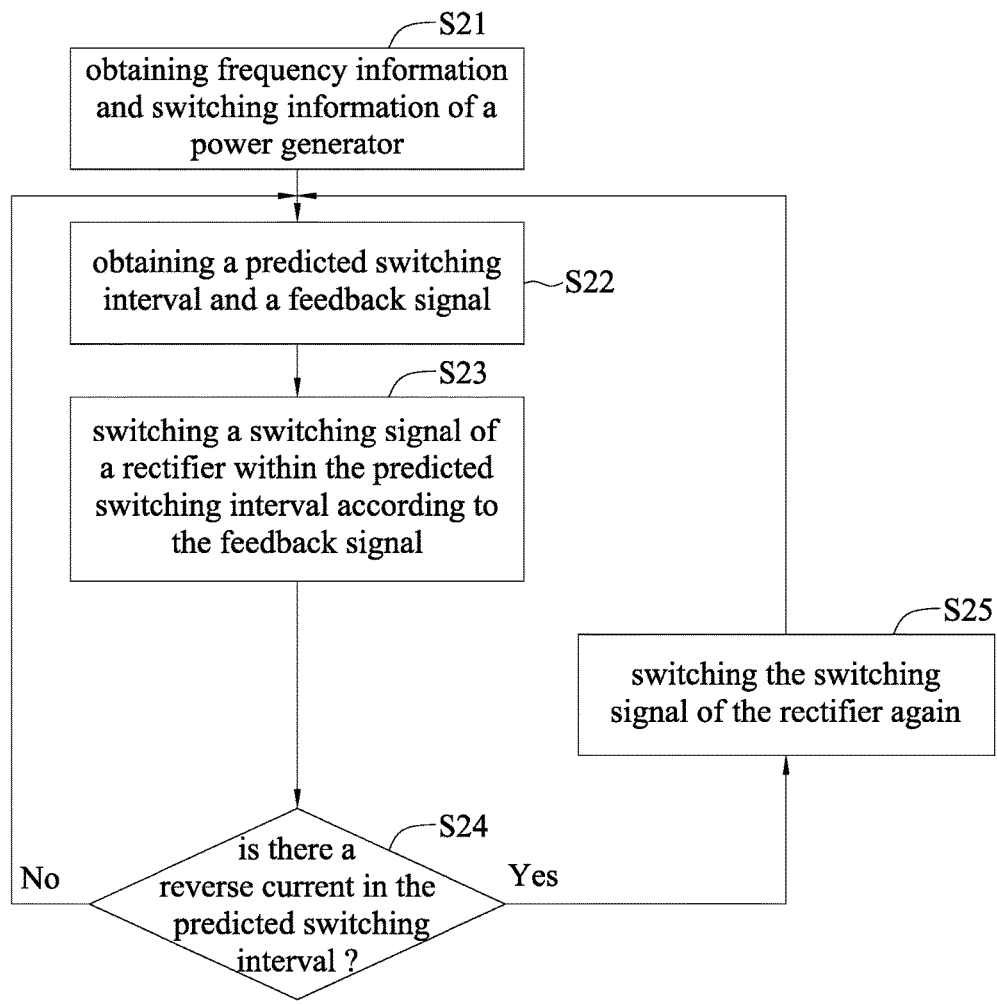
FIG. 2 is a flowchart illustrating the method for controlling a rectifier in accordance with another embodiment of the disclosure.

Referring to FIGS. 2, 5, 7A, 7B and 7C, steps 21-23 of FIG. 2 in accordance with an embodiment of the disclosure are the same or similar to steps S11-S13 of FIG. 1, and thus will not be repeated.

Figure 7C:
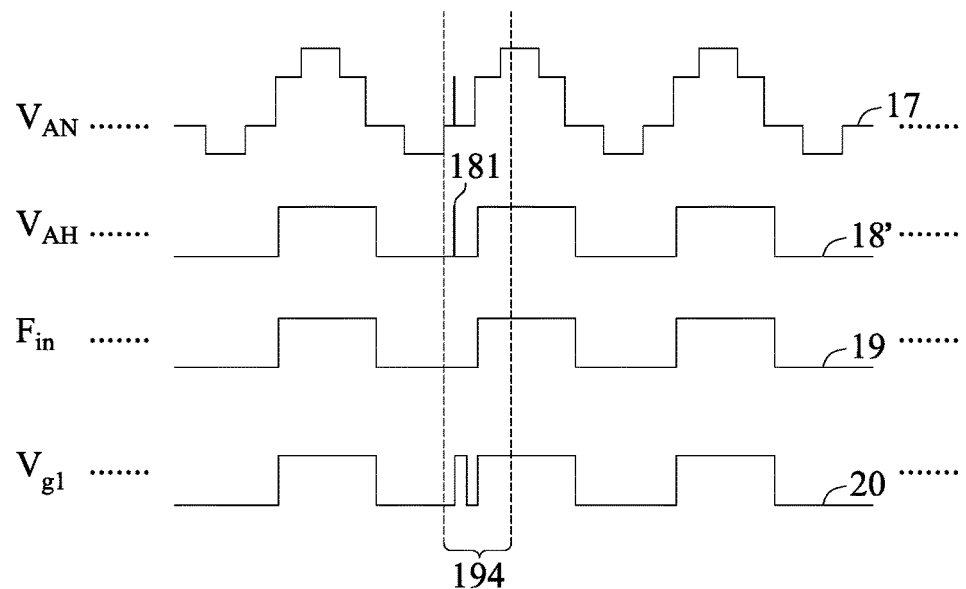

As shown in step S24 of FIG. 2, in an embodiment, it is determined if there is a reverse current appearing in the predicted switching interval. For example, by detecting the feedback voltage $V_{AH}$ of FIGS. 5 and 6 or detecting a feedback current $I_A$ of FIG. 6, it can be determined if a reverse current is generated. Referring to FIG. 7C, take detecting the feedback voltage $V_{AH}$ as an example. In an embodiment, the waveform of the feedback voltage $V_{AH}$ is a feedback voltage waveform 18' within the predicted switching interval 194, and by detecting the feedback voltage $V_{AH}$, it is determined if a reverse current is generated. For example, if the feedback voltage waveform 18' has a waveform fluctuation 181, a reverse current is detected. In other words, when a current flows from the battery 14 to the switching component $M_1$ of the rectifying unit 12, causing the generation of a reverse current, the feedback voltage waveform 18' of the feedback voltage $V_{AH}$ will have the waveform fluctuation 181. As a result, the feedback voltage waveform 18' has a waveform variation that goes from a low voltage (logic 0) to a high voltage (logic 1), immediately followed by going from a high voltage (logic 1) to a low voltage (logic 0). If, in step S24, it is determined that a reverse current has appeared in the predicted switching interval 194, then proceed to step S25. In step S25, the switching signal $V_{g1}$ of the switching component $M_1$ of the rectifying unit 12 is switched again. For example, if a reverse current is generated in the predicted switching interval 194 (i.e., having the waveform fluctuation 181), the control unit 13 will perform a reverse signal switching to the rectifying unit 12. In an embodiment, this act may cancel the switching action of the switching component caused by a false determination due to noise. For example, the switching signal $V_{g1}$ generated in FIG. 7B has been switched to an "on" signal in the predicted switching interval 194 so as to cause the switching component $M_1$ of the rectifying unit 12 to be in an on/conducting state. If a reverse current is detected in FIG. 7C (i.e., the waveform fluctuation 181), the switching signal $V_{g1}$ generated by the control unit 13 will now be switched to an "off" signal, turning off the switching component M1 of the rectifying unit 12 (i.e., the switching component $M_1$ is in an off/non-conducting state). Next, the method returns to step S22 to obtain the next predicted switching interval and iterates the actions of steps S22 to S24. In an embodiment, after turning off the switching component $M_1$ of the rectifying unit 12, it is not necessary to obtain the next predicted switching interval, the control unit 13 can again determine if the source voltage is greater than the drain voltage based on the feedback voltage $V_{AH}$ in the predicted switching interval 194 to determine whether to switch the voltage of the switching signal $V_{g1}$ again. If in step S24, there is no reverse current detected in the predicted switching interval, then return to step S22. For example, if no waveform fluctuation 181 of the feedback voltage waveform 18' is detected, meaning there is no reverse current detected, and the switching action in the predicted switching interval 194 was correct, and it is not necessary to perform signal switching on the rectifier again. Return to step S22 to obtain the next predicted switching interval and iterate the actions in steps S22 to S24.

Figure 3:
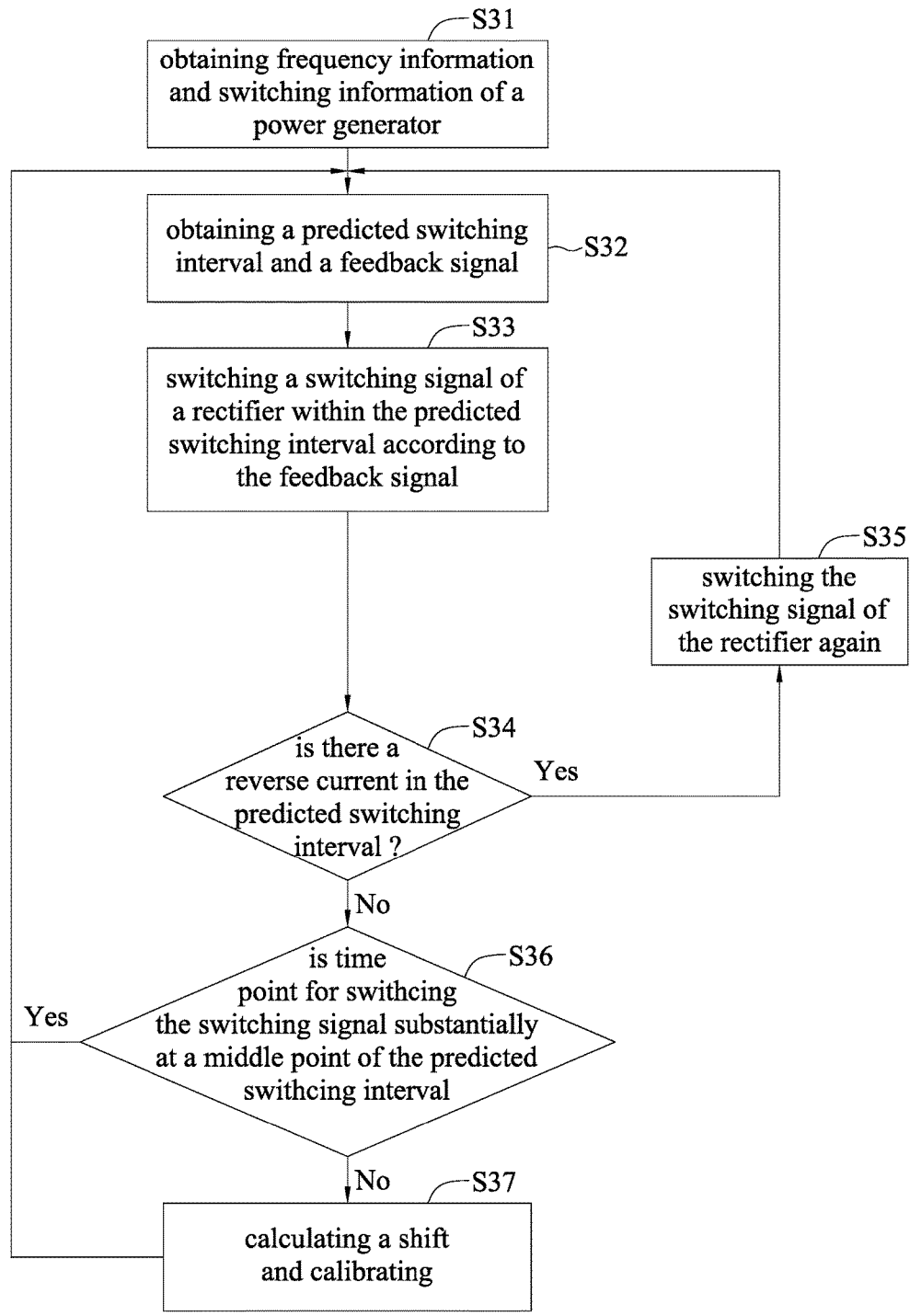
FIG. 3 is a flowchart illustrating the method for controlling a rectifier in accordance with yet another embodiment of the disclosure.

Referring to FIGS. 3, 5, 7A to 7D, steps 31-35 of FIG. 3 in accordance with an embodiment of the disclosure are the same or similar to steps S21-S25 of FIG. 2, steps 31-33 of FIG. 3 are also the same or similar to steps S11-S13 of FIG. 1, and thus will not be repeated.

Figure 7D:
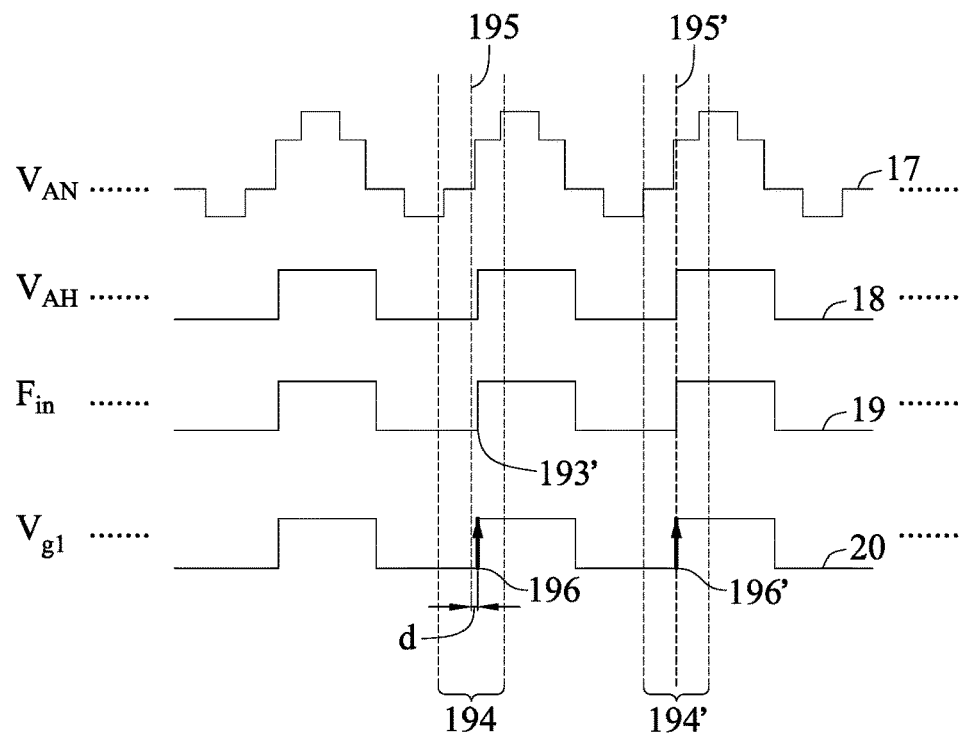

In step S36, it is determined if the time point for switching the switching signal is substantially at the middle point of the predicted switching interval. "The middle point" is the midpoint of the range of the predicted switching interval. Referring to FIG. 7D, it is determined if a time point 196 for switching the switching signal is substantially at the middle point 195 of the predicted switching interval 194. If, in step S36, the time point 196 for switching the switching signal is not substantially at the middle point 195 of the predicted switching interval 194, the method proceeds to step S37, in which a substantial shift that the time point 196 for switching the switching signal is shifted from the middle point 195 is calculated, thereafter, return to step S32; if in step S36, the time point 196 for switching the switching signal is substantially at the middle point 195 of the predicted switching interval 194, then go back to step S32. More specifically, referring to FIG. 7D, if the time point 196 for switching the switching signal is not substantially at the middle point 195 of the predicted switching interval 194, then the control unit 13 calculates a shift d that the time point 196 for switching the switching signal is shifted from the middle point 195. The shift d will be used for calibrating the next time point 196' for switching the switching signal in the next predicted switching interval 194' so that the next time point 196' for switching the switching signal will be substantially at the middle point 195' of the next predicted switching interval 194'. In an embodiment, this calibration avoids misjudgment of the predicted switching interval 194, which may cause the actual switching point to land outside the predicted switching interval 194.

The steps S36 and S37 above are mainly used when there is a variation in the frequency information, for example, when there is a variation in the rotational speed information (e.g., when the rotational speed of the power generator is affected by the car accelerating or decelerating), then steps S36 and S37 can be used to obtain the shift d that the time point 196 for switching the switching signal is shifted from the middle point 195, which is then used to adjust the next time point 196' for switching the switching signal to be at the middle point 195' of the next predicted switching interval 194'. If the time point 196 for switching the switching signal is always at the middle point 195 of the predicted switching interval 194, then there is no need for calibration. In an embodiment, there is no variation in the frequency information, for example, the car is going at a constant speed, then the time point 196 for switching the switching signal is always at the middle point 195 of the predicted switching interval 194, and there is no need for calibration.

In this embodiment, steps S36 and S37 are not necessarily performed after step S34; steps S34 and S35 can also be omitted, so that steps S36 and S37 are performed after step S33; the disclosure is not limited as such.

In the various embodiments above, in addition to comparing the voltages between the two terminals of a switching component, current direction information of the two terminals of the switching component can also be determined to decide whether to switch the switching signal, which in turn cause the switching component $M_1$ to be in an off or on state. As shown in FIG. 6, comparators 261, 262 or 263 (e.g., a 1-bit comparator) uses a current sensor 271, 272 or 273 installed above a battery 24 or below a rectifying unit 22 to determine the current direction information of the two terminals (e.g., the feedback current $I_A$ in FIG. 6) of the switching component of the rectifying unit 22, and the switching signal is or is not switched accordingly, which in turn cause the switching component $M_1$ to be in an off or on state. In addition to comparing the voltages between the two terminals of a switching component or determining the current direction information of the two terminals of the switching component alone, these two methods can be used simultaneously, and the disclosure is not limited as such. Moreover, the disclosure also does not restrict the location where the current sensors are placed.

Figure 4:
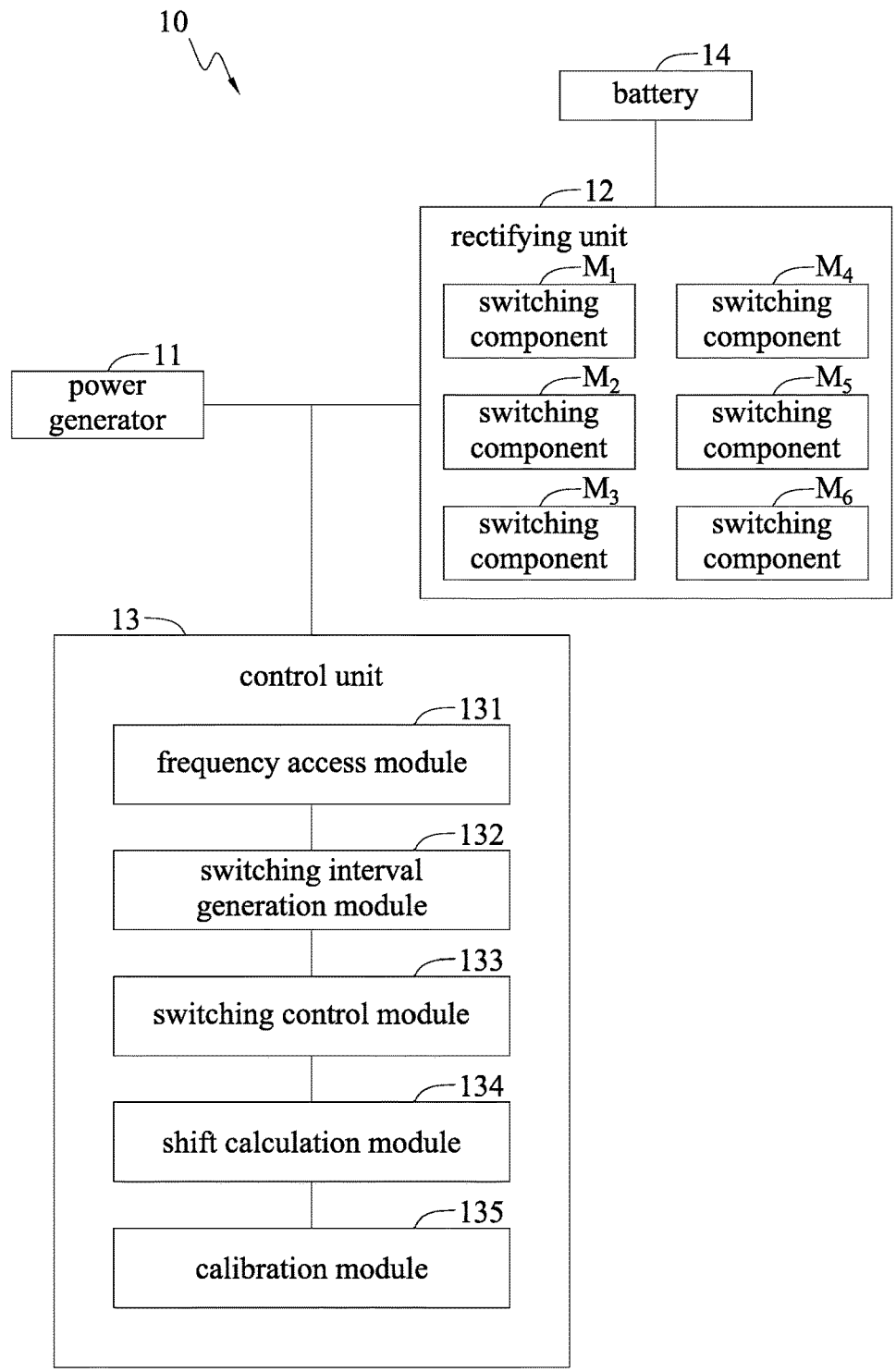
FIG. 4 is a functional block diagram depicting a system for controlling a rectifier in accordance with the disclosure.

Referring to FIG. 4, a system for controlling a rectifier 10 in accordance with an embodiment of the disclosure is disclosed. The system for controlling a rectifier 10 of the disclosure may perform the methods in various embodiments described with respect to FIGS. 1, 2 and 3 above. The system for controlling a rectifier 10 includes a power generator 11, a rectifying unit 12, a control unit 13 and a battery 14.

In an embodiment, the power generator 11 can be a three-phase AC generator, but the disclosure is not so limited. The rectifying unit 12 includes a plurality of switching components $M_1$-$M_6$. In this embodiment, the rectifying unit 12 can be an active rectifier. The switching components can be MOSFETs. In this embodiment, the number of switching component is six, but the disclosure is not so limited. As described before and as shown in FIGS. 5 and 7A to 7D, when the power generator 11 is just starting up, a voltage $V_A$ can be provided to the plurality of switching components (e.g., the switching component $M_1$) of the rectifying unit 12. The waveform of the voltage $V_{AN}$ ($V_{AN}$ is the voltage difference between Va and N in this embodiment) can be, for example, the voltage waveform 17, and is used to charge the battery 14 using body diode 121 in the switching component $M_1$ by passive rectification.

The control unit 13 further includes a frequency access module 131, a switching interval generation module 132, a switching control module 133, a shift calculation module 134 and a calibration module 135. In this embodiment, the control unit 13 can be a controller, and the modules refer to firmware or software stored in the controller for operating by the controller. In an embodiment, the control unit 13 can be a processor, or a hardware circuit or element. In an embodiment, each module can be firmware or software in a separate or a combinational hardware circuit(s) or element(s).

The frequency access module 131 is used for obtaining frequency information and switching information of the power generator 11. The way to obtain the frequency information can be achieved by comparing the voltage across the drain and the source terminals of the switching component $M_1$ (other switching components have the same or similar technical contents) by a comparator 151 (e.g., a 1-bit comparator) to obtain a voltage $V_{AH}$, so that the frequency access module 131 of the control unit 13 can obtain the frequency information of the voltage $V_{AH}$, but the disclosure is not so limited. The way to obtain the frequency information may further include: (1) obtaining a frequency of a three-phase voltage (e.g., $V_U$, $V_V$, and $V_W$ in FIGS. 5 and 6) of the power generator 11 calculated from the rotational speed of the power generator 11; (2) obtaining based on a three-phase AC current generated by the power generator 11; (3) obtaining from the $V_{DS}$ of the switching component $M_1$ when the switching component $M_1$ in the rectifying unit 12 is off; (4) obtaining using a current sensor 271, 272 or 273 (as shown in FIG. 6). After the frequency access module 131 obtains the voltage waveform 17 of the power generator 11, the frequency information (i.e., $F_{in}$) is obtained by zero-crossing detection. The zero-crossing detection means detecting when the waveform in the AC system passes through zero when switching from the positive half cycle to the negative half cycle or from the negative half cycle to the positive half cycle.

In an embodiment, the frequency information can be derived (calculated) from the rotational speed of the power generator 11 (e.g., calculating the frequency of a three-phase voltage based on the rotational speed of the power generator 11), or obtained from a three-phase alternative current generated by the power generator 11, or obtained from $V_{DS}$ of the switching component $M_1$ (voltage across the drain and source terminals of the switching component $M_1$) or from a current sensor; the disclosure is not limited to these. In an embodiment, switching information can be obtained based on the frequency information (e.g., switching time is obtained based on the frequency). In another embodiment, the frequency information and the switching information can be obtained independently (e.g., the switching information is obtained from the voltage or current information alone, and the frequency information is obtained from any of rotational speed, voltage, or current information) or obtained dependently; the disclosure does not limit the way the two information are obtained.

The switching interval generation module 132 is used for obtaining the switching information based on the frequency information, or obtaining the switching information from the voltage or the current independently. The switching information may include a switching interval 191 and a switching point 193, and the switching interval can be a time interval or a time point. In addition to obtaining the switching information, the switching interval generation module 132 may also obtain a predicted switching interval 194 based on the frequency information and the switching interval 191. In an embodiment, the predicted switching interval 194 can be a predicted time interval or a predicted time point. More specifically, the switching interval generation module 132 predicts the next switching point 193' based on the period T included in the frequency information and the switching point 193. Thereafter, the switching interval 191 and the predicted switching interval 194 are determined using the switching point 193 and the next switching point 193' as the respective centers with respective ranges that equal to specific percentage ranges of half of the period T of the frequency information, and the interval between the switching interval 191 and the predicted switching interval 194 is determined as a non-switching interval 192. An interval between the next switching point 193' and the switching point 193 is a half of the period T of the frequency information. In an embodiment, the switching interval 191 can be determined using the switching point 193 as the center having a range that equals to a first specific percentage range of half of the period T of the frequency information, and the predicted switching interval 194 can be determined using the next switching point 193' as the center having a range that equals to a second specific percentage range of half of the period T of the frequency information. In this embodiment, the first and the second specific percentage ranges can be the same or different, for example, both can be a range of ±10%; or one can be a range of ±10% and the other can be a range of ±20%, while the disclosure is not so limited. The first and the second specific percentages can be, for example, percentages of half of the period T, and the disclosure is not so limited. In an embodiment, the range (e.g., the percentage of half of the period T) for each predicted switching interval 194 can be the same or different or partially the same (e.g., can be dynamically adjusted). For example, the ranges of the predicted switching interval 194 and the next predicted switching interval 194' in FIG. 7D can be the same or different or partially the same. In an embodiment, when the first specific percentage is 0%, then the switching interval 191 determined as such would be the switching point 193. In an embodiment, when the second specific percentage is 0%, then the predicted switching interval 194 determined as such would be the next switching point 193'. One with ordinary skill in the art can determine the numerical ranges of the switching interval 191 and the predicted switching interval 194 as required, and the disclosure is not so limited.

The switching control module 133 is used for obtaining a corresponding feedback signal, and is used for controlling a switching signal of at least one of the plurality of switching component $M_1$-$M_6$ based on the switching signal during the predicted switching interval, wherein the corresponding feedback signal is obtained from two terminals of the at least one of the plurality of switching component $M_1$-$M_6$. In an embodiment, more than one of the plurality of switching components $M_1$-$M_6$ can be switched simultaneously or sequentially; the disclosure is not so limited. The descriptions below use the switching component $M_1$ as an example. More specifically, a comparator 151 (e.g., a 1-bit comparator) compares the voltages of the drain and the source terminals of the switching component $M_1$ of the rectifying unit 12 to generate a feedback voltage $V_{AH}$, and the switching control module 133 receives the feedback voltage $V_{AH}$ of the switching component $M_1$ of the rectifying unit 12 (the waveform of the feedback voltage $V_{AH}$, for example, is the feedback voltage waveform 18), so that the switching control module 133 switches a switching signal $V_{g1}$ provided to the gate of the switching component $M_1$ by the control unit 13. For example, if the source voltage of the switching component $M_1$ is greater than the drain voltage, then the gate voltage is switched from Low to High. The switching control module 133 switches the switching signal $V_{g1}$, such that the switching component M1 is in an on/conducting state in order to charge the battery 14. Accordingly, the switching control module 133 may switch the switching signal $V_{g1}$ during the predicted switching interval 194 (e.g., switch the voltage of the switching signal $V_{g1}$, so that the switching component M1 is switched from on/conducting to off/non-conducting, or from off/non-conducting to on/conducting). In the non-switching interval 192, no signal switching is performed. In other words, switching means causing the switching component $M_1$ to be in an off or an on state. For example, when the comparator 151 compares the voltages at the drain and the source terminals of the switching component $M_1$ of the rectifying unit 12, if the source voltage is greater than the drain voltage and is in the predicted switching interval, this implies that the switching control module 133 will switch the voltage of the switching signal $V_{g1}$, which makes the switching component $M_1$ to be in an on/conducting state; else the switching component $M_1$ would be in an off/non-conducting state.

It should be noted that there is no specific order in which the switching interval generation module 132 obtaining the switching information based on the frequency information of the voltage $V_{AH}$ in order to determine the predicted switching interval 194, and the control unit 13 comparing the voltages at the source and drain of the switching component $M_1$ of the rectifying unit 12. The switching interval generation module 132 can obtain the predicted switching interval 194 before the control unit 13 compares the voltages at the source and drain of the switching component $M_1$ of the rectifying unit 12; or the control unit 13 can compare the voltages at the source and drain of the switching component $M_1$ of the rectifying unit 12 before the switching interval generation module 132 obtains the predicted switching interval 194; or the control unit 13 can compare the voltages at the source and drain of the switching component $M_1$ of the rectifying unit 12 at the same time as the switching interval generation module 132 is obtaining the predicted switching interval 194; the disclosure is not so limited. After the control unit 13 has compared the voltages at the source and drain of the switching component $M_1$ of the rectifying unit 12 and the switching interval generation module 132 has obtained the predicted switching interval 194, the switching control module 133 may then perform the switching of the switching signal $V_{g1}$ in the predicted switching interval 194.

In addition to adopting the method of comparing the voltages between the two terminals of the switching component, as shown in FIG. 6, the switching control module 133 may instruct a comparator 261 (e.g., a 1-bit comparator) to use a current sensor 271 installed above a battery 24 or below a rectifying unit 22 (the function of the current sensor 272 and the current sensor 273 in FIG. 6 are similar to the current sensor 271) to determine the current direction information between the two terminals of the switching component of the rectifying unit 22, so that the switching control module 133 can switch the switching signal according to the result output by the comparator 261 in order to put the switching component $M_1$ of the conductive elements 22 in an off or an on state. In addition to comparing the voltages between the two terminals of a switching component or determining the current direction information of the two terminals of the switching component independent, these two methods can be used simultaneously, and the disclosure is not so limited. Moreover, the disclosure also does not restrict the location where the current sensors are placed.

Moreover, the switching control module 133 is further used for detecting if there is a reverse current appearing in the predicted switching interval 194. If so, then the corresponding switching signal of one of the plurality of switching component $M_1$-$M_6$ in the rectifying unit 12 is switched again. The descriptions below use the switching component $M_1$ as an example. As shown in FIG. 7C, the feedback voltage waveform 18' in the predicted switching interval 194 has a waveform fluctuation 181, and, as a result, the feedback voltage waveform 18' has a waveform variation that goes from a low voltage (logic 0) to a high voltage (logic 1), immediately followed by going from a high voltage (logic 1) to a low voltage (logic 0). This can be determined as the occurrence of reverse current. The switching control module 133 will then switch the switching signal $V_{g1}$ of the switching component $M_1$ of the rectifying unit 12 again to cancel out the switching action of the switching component caused by a false determination due to noise. For example, the switching signal $V_{g1}$ generated in FIG. 7B is an "on" signal, which causes the switching component $M_1$ of the rectifying unit 12 to be in an on/conducting state. If a reverse current is detected according to the feedback voltage $V_{AH}$ as shown in the waveform fluctuation 181 in FIG. 7C, the switching signal $V_{g1}$ generated by the control unit 13 will now be switched to an "off" signal, turning off the switching component $M_1$ of the rectifying unit 12 (i.e., the switching component $M_1$ is switched from the on/conducting state to an off/non-conducting state). If the switching control module 133 detects no reverse current in the predicted switching interval (i.e., no waveform fluctuation 181), then this means the switching action in the predicted switching interval 194 was correct, and it is not necessary to perform signal switching on the rectifier again.

The shift calculation module 134 is used for calculating a shift d that a time point 196 for switching the switching signal is shifted from a middle point 195 of the predicted switching interval 194 when the time point 196 for switching the switching signal is not substantially at the middle point 195. More specifically, as shown in FIG. 7D, when the time point 196 for switching the switching signal is not substantially at the middle point 195 of the predicted switching interval 194, the shift calculation module 134 calculates a shift d of a time point 196 for switching the switching signal from a middle point 195 of the predicted switching interval 194, and the calibration module 135 calibrates the next time point 196' for switching the switching signal to the middle point 195' of the next predicted switching interval 194' according to the shift d. The calibration module 135 may avoid misjudgment in the predicted switching interval 194, which may cause the actual switching point to land outside the predicted switching interval 194.

According to the above, through the method and system for controlling a rectifier in accordance with an embodiment of the disclosure, the power generation system in automobiles does not need to have a powerful filter or a large-range hysteresis comparator. This reduces power loss. According to an embodiment of the disclosure, a predicted switching interval can be obtained, and a switching signal of a switching component of the rectifier is switched in the predicted switching interval, but is not switched in a predicted non-switching interval. This eliminates noise interference, and also allows a more precise switching point, further reducing unnecessary power loss. Moreover, in an embodiment of the disclosure, the predicted switching intervals can be acquired accurately, and reverse current detection and calibration of time points for switching the switch signal can also be performed when the frequency information varies dynamically, increasing reliability of use. Accordingly, an embodiment of the disclosure achieves simple, low-cost, highly accurate and highly reliable switching control of switches.

The above embodiments are only used to illustrate the principles of the disclosure, and should not be construed as to limit the disclosure in any way. The above embodiments can be modified by those with ordinary skill in the art without departing from the scope of the disclosure as defined in the following appended claims.

What is claimed is:

1. A method for controlling a rectifier, comprising:
obtaining frequency information and line information of a power generator, the line information comprising:
a switching point that is a time point at which a voltage or a current of the power generator crosses zero; and
a switching interval having a first duration of up to a half period corresponding to a reciprocal of the frequency information, wherein the switching point is at a center of the switching interval;
obtaining a predicted switching interval according to the frequency information and the line information, and obtaining a feedback signal according to a first terminal and a second terminal of at least one switching component of the rectifier; and
switching a switching signal of the rectifier within the predicted switching interval according to the feedback signal, wherein the switching signal is switched to cause the switching component to be in an on state or in a conducting state if a voltage of the first terminal is greater than a voltage of the second terminal within the predicted switching interval, and the switching signal is switched to cause the switching component to be in an off state or in a non-conducting state if the voltage of the first terminal is less than the voltage of the second terminal within the predicted switching interval.

2. The method of claim 1, wherein the frequency information is obtained by zero crossing detection of a voltage or a current of the power generator.

3. The method of claim 1, wherein a next switching point is the half period corresponding to the reciprocal of the frequency information away from the switching point.

4. The method of claim 3, wherein the predicted switching interval has a second duration of up to the half period corresponding to the reciprocal of the frequency information, and the next switching point is a center of the predicted switching interval.

5. The method of claim 1, wherein switching the switching signal of the rectifier further includes determining current direction information between the two terminals of the at least one switching component of the rectifier within the predicted switching interval.

6. The method of claim 1, further comprising, after switching the switching signal of the rectifier within the predicted switching interval, determining if a time point for switching the switching signal is in a middle point of the predicted switching interval, and calculating a shift that the time point for switching the switching signal is shifted from the middle of the predicted switching interval if the time point is not in the middle point of the predicted switching interval.

7. The method of claim 6, further comprising calibrating a next time point for switching the switching signal based on the shift that the time point for switching the switching signal is shifted from the middle point of the predicted switching interval, wherein the next time point for switching the switching signal is at the middle point of a next predicted switching interval.

8. The method of claim 1, further comprising, after switching the switching signal of the rectifier within the predicted switching interval, detecting if there is a reverse current in the predicted switching interval, and switching the switching signal of the rectifier again if there is the reverse current in the predicted switching interval.

9. A system for controlling a rectifier, comprising:
a power generator;
a rectifying unit including a plurality of switching components; and
a control unit including:
a frequency access module configured for obtaining frequency information and line information of the power generator;
a switching interval generation module configured for obtaining a predicted switching interval according to the frequency information and the line information, the line information comprising:
a switching point that is a time point at which a voltage or a current of the power generator crosses zero; and
a switching interval having a first duration of up to a half period corresponding to a reciprocal of the frequency information, wherein the switching point is at a center of the switching interval; and
a switching control module configured for obtaining a feedback signal and controlling a switching signal of at least one of the plurality of switching components within the predicted switching interval according to the feedback signal, wherein the feedback signal is obtained according to a first terminal and a second terminal of the at least one of the plurality of switching components, wherein the switching signal is switched to cause the switching component to be in an on state or in a conducting state if a voltage of the first terminal is greater than a voltage of the second terminal within the predicted switching interval, and the switching signal is switched to cause the switching component to be in an off state or in a non-conducting state if the voltage of the first terminal is less than the voltage of the second terminal within the predicted switching interval.

10. The system of claim 9, wherein the frequency access module obtains the frequency information by zero crossing detection of a voltage or a current of the power generator.

11. The system of claim 9, wherein the switching interval generation module determines a next switching point as the half period corresponding to the reciprocal of the frequency information away from the switching point.

12. The system of claim 11, wherein the switching interval generation module forms the predicted switching interval having a second duration of up to the half period corresponding to the reciprocal of the frequency information, and the next switching point is a center of the predicted switching interval.

13. The system of claim 9, wherein the switching control module receives voltages compared by a comparator between the two terminals of the at least one of the plurality of switching components of the rectifying unit or current direction information determined between the two terminals of the at least one of the plurality of switching components of the rectifying unit within the predicted switching interval in order to switch the switching signal.

14. The system of claim 9, wherein the control unit further includes a shift calculation module configured for calculating a shift that a time point for switching the switching signal is shifted from a middle point of the predicted switching interval if the time point for switching the switching signal is not at the middle point of the predicted switching interval.

15. The system of claim 14, wherein the control unit further includes a calibration module configured for calibrating a next time point for switching the switching signal based on the shift, and wherein the next time point for switching the switching signal is at the middle point of a next predicted switching interval.

16. The system of claim 9, wherein the switching control module is configured for detecting if there is a reverse current after switching the switching signal within the predicted switching interval, and switching the switching signal of the at least one of the plurality of switching components again if there is the reverse current.

17. The system of claim 9, wherein the plurality of switching components are Metal-Oxide-Semiconductor Field-Effect Transistors (MOSFET).

* * * * *